United States Patent
Ono

(10) Patent No.: US 6,233,003 B1
(45) Date of Patent: May 15, 2001

(54) PARALLAX IMAGE INPUT APPARATUS

(75) Inventor: Shuji Ono, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/898,659

(22) Filed: Jul. 22, 1997

(30) Foreign Application Priority Data

Jul. 22, 1996 (JP) .................................................. 8-191853

(51) Int. Cl.[7] .................................................. H04N 13/02
(52) U.S. Cl. .............................. 348/47; 396/324; 352/58; 352/62
(58) Field of Search .................. 348/47, 49, 46; 359/40; 354/112

(56) References Cited

U.S. PATENT DOCUMENTS

| | | | |
|---|---|---|---|
| 3,677,317 | * 7/1972 | Upatnieks | 350/3.5 |
| 4,677,468 | 6/1987 | Morishita | 358/88 |
| 4,978,983 | * 12/1990 | StAlfors | 354/76 |
| 5,448,322 | * 9/1995 | Bacs, Jr. | 354/112 |
| 5,475,513 | * 12/1995 | Nakanishi et al. | 359/40 |
| 5,696,596 | * 12/1997 | Taniguchi | 358/300 |
| 5,717,453 | * 2/1998 | Wohlstadter | 348/46 |
| 5,719,620 | * 2/1998 | Allio | 348/49 |

FOREIGN PATENT DOCUMENTS

| | | | |
|---|---|---|---|
| 0 645 659 | 3/1995 | (EP) | G02B/27/22 |
| WO 92/22989 | 12/1992 | (WO) | H04N/13/00 |
| WO 95/12954 | 5/1995 | (WO) | H04N/13/00 |

OTHER PUBLICATIONS

"Computer Vision" by Koichiro Deguchi, Maruzen, pp. 83–88.

"Image Processing Handbook" by Morio Ogami, Shokodo, pp. 395–397.

"Object Detection Using Multiview Stereo Images" by Omori and Morishita, SICE collected papers, vol. 18, 7, pp 716–722, Jul. 1982.

"Recognition of Three–Dimensional Object Using Multiple Images" by Masahiko Taniuchida, Nikkei Mechanical, vol. 157, pp. 82–91, Jan. 1984.

"Stereo Vision Corresponding Points Procesing with Trinocular Images" by Itoh and Ishii, 29'th national meeting of Information Processing Society of Japan, 2M–3, Sep. 1984.

"Trinocular Vision Stereo" by Ota and Ikeda, ibid., 2M–4.

"Determining Three–dimensional Structure From Image Sequences given by Horizontal and Vertical Moving Camera" by Yamamoto, collected papers of the Institute of Electronics and Communication Engineers of Japan, vol. J69–D, No. 11, 1631.

"Depth measurement by motion stereo" by R. Nevatia, Comput. Graphics Image Process., vol. 9, pp. 23–214, 1976.

"Depth from camera motion in a real world scene" by T.D. Williams, IEEE Trans. Pattern Anal. Mach, Intell., PAMI–2, pp. 511–516, 1980.

"Pencil of Light" by Tsuruta, new Technical Communications, pp. 31–33.

"Visual Perception Mechanism related to Binocular Stereo Vision Technology" by Hitoshi Ohzu, transactions of The Japan Society for Precision Engineering, vol. 54, 5–11, 1988.

* cited by examiner

Primary Examiner—Chris Kelley
Assistant Examiner—Shawn S. An
(74) Attorney, Agent, or Firm—Sughrue, Mion, Zinn Macpeak & Seas, PLLC

(57) ABSTRACT

A parallax image input apparatus for acquiring a plurality of images seen from different viewpoints, comprises an image forming device for forming images of the external world, and a parallax image pickup device for selectively imaging pieces of image information, which have passed through different positions in the image forming device, and converting the pieces of image information into image signals. The apparatus also comprises an image recording device for recording the image signals, which have been obtained from the parallax image pickup device. The apparatus has a simple constitution and easily obtains parallax images seen from many viewpoints.

8 Claims, 11 Drawing Sheets

F I G. 12
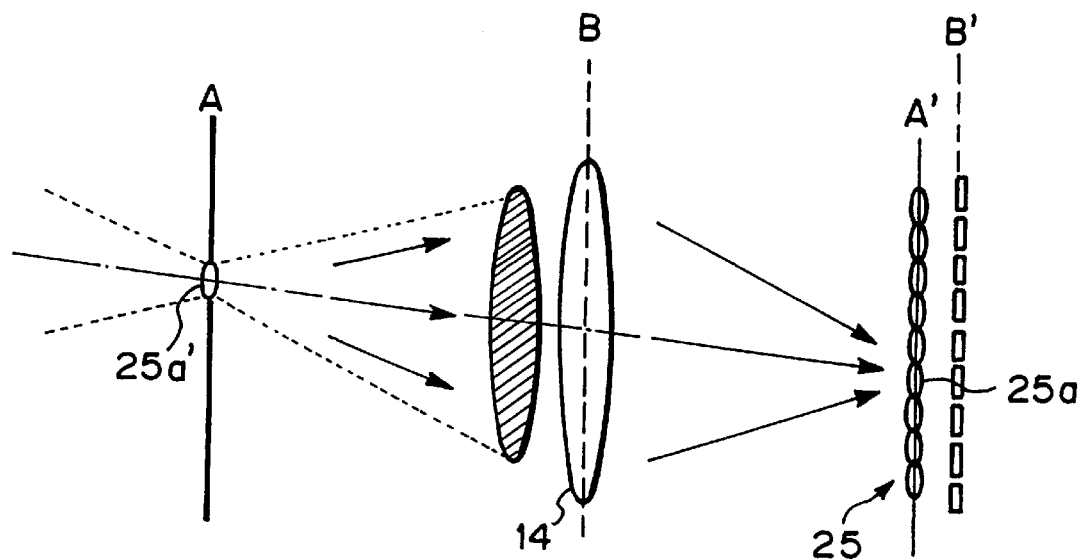
F I G. 13
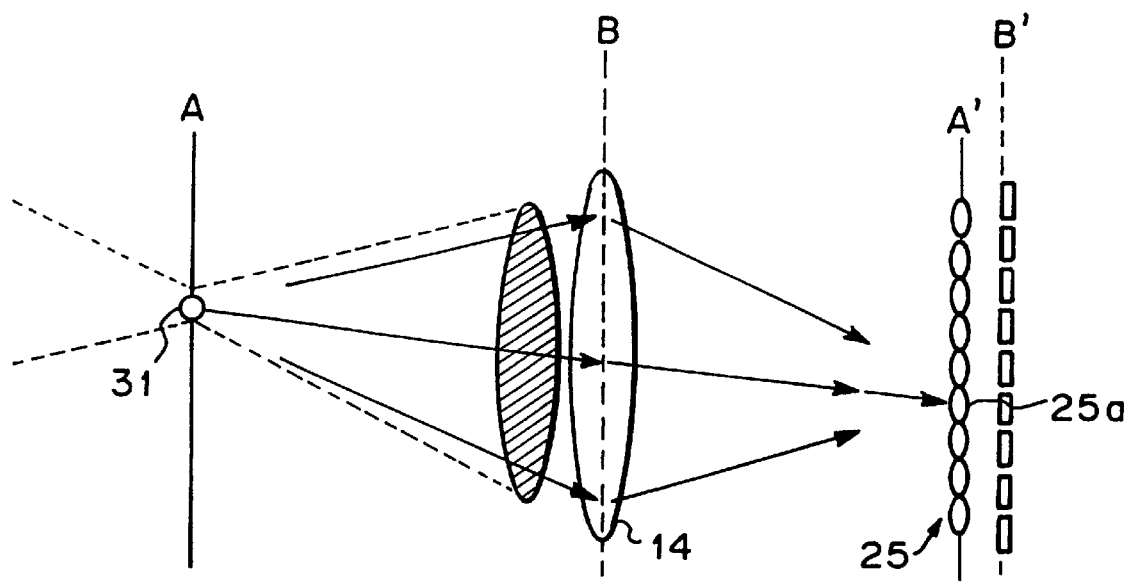

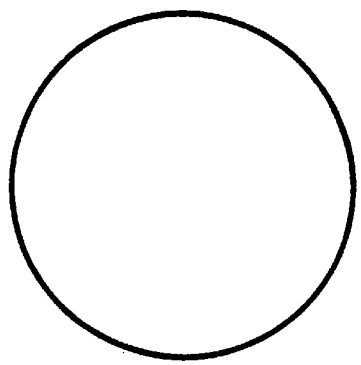
F I G. 14A
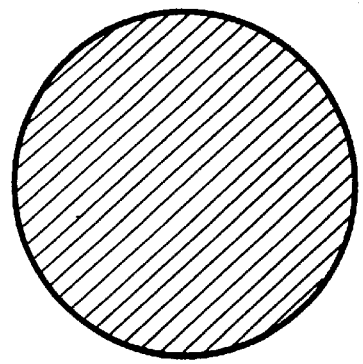
F I G. 14B
F I G. 15
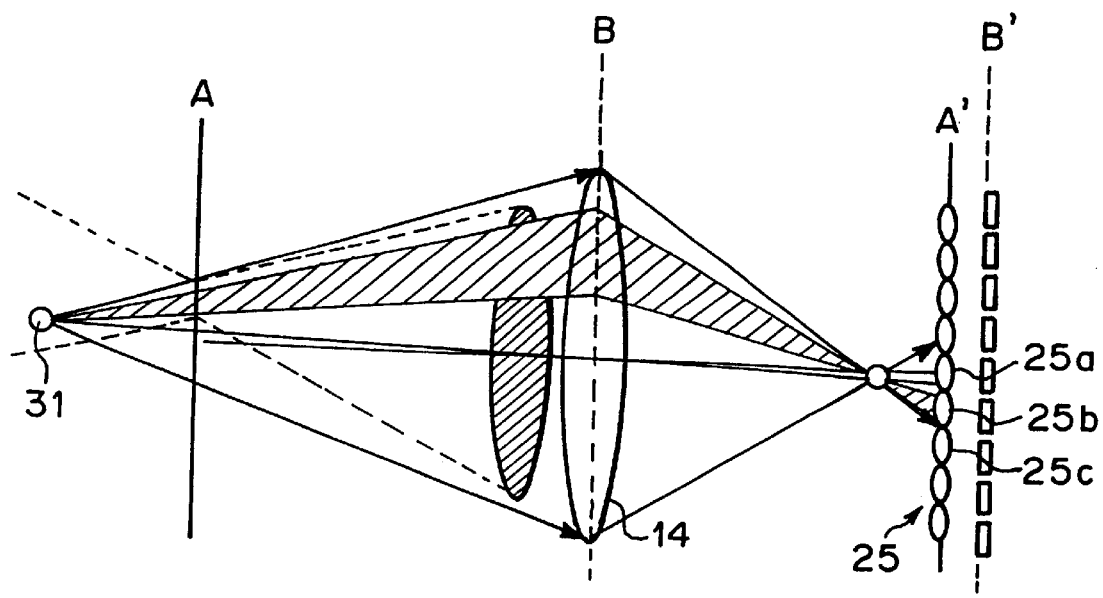

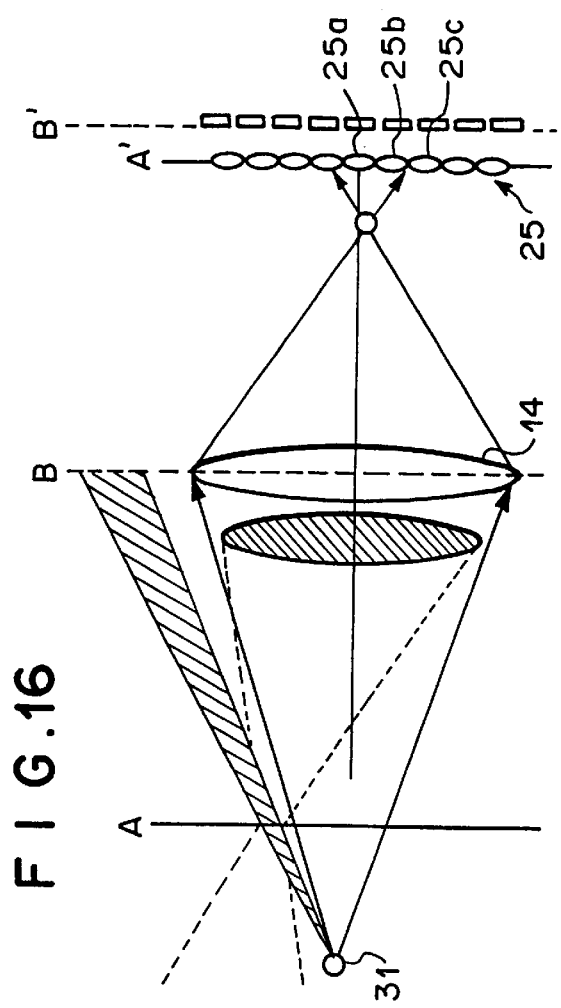
FIG.16
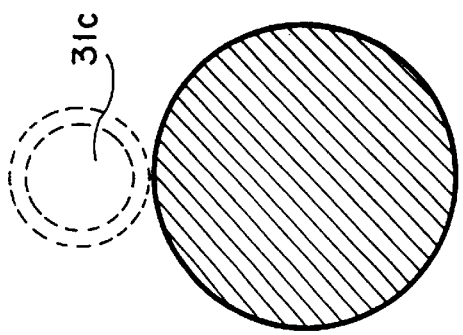
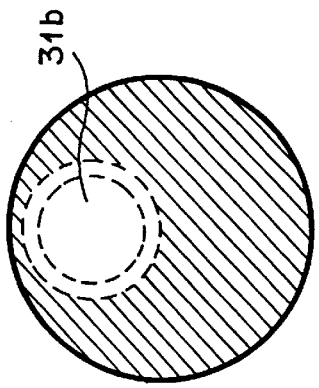
FIG.17B
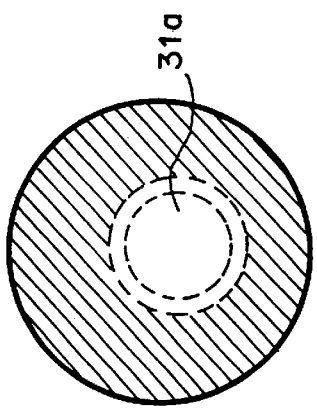
FIG.17A

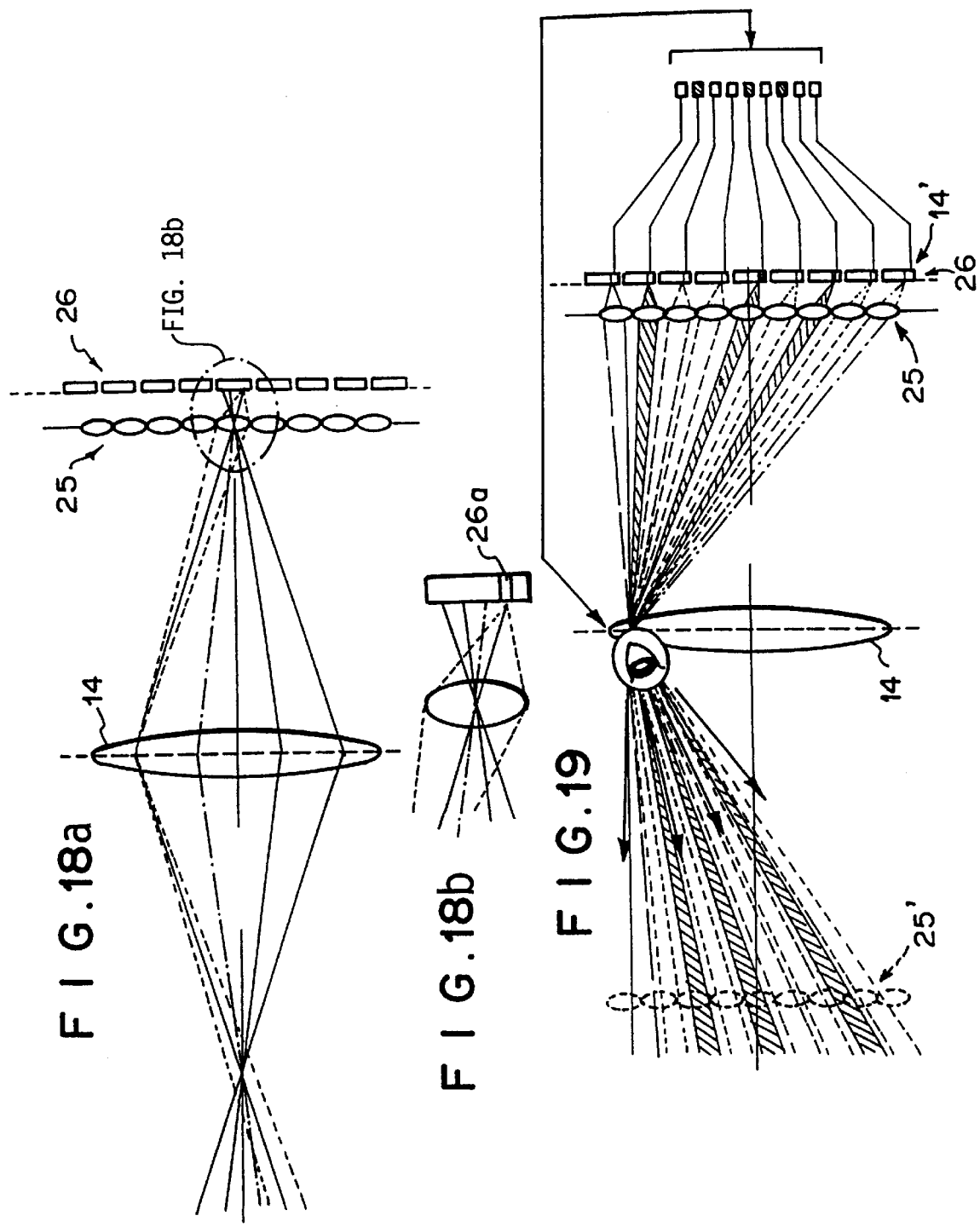

PARALLAX IMAGE INPUT APPARATUS

BACKGROUND OF THE INVENTION

1. Field of the Invention

This invention relates to a parallax image input apparatus. This invention particularly relates to a novel apparatus for acquiring a plurality of images having parallax.

2. Description of the Prior Art

Techniques for detecting the information concerning the depth direction of an object by utilization of parallax images and restoring the information belong to the field of "computer vision" or "image understanding" in research of image processing. The techniques are considered as being important for realization of artificial visual functions.

As techniques for inputting parallax images, various techniques utilizing two cameras, which are located so as to simulate the binocular vision of the human, have heretofore been proposed. Such techniques are described in, for example, "Computer Vision" by Koichiro Deguchi, Maruzen, pp. 83–88, and "Image Processing Handbook" by Morio Ogami, Shokodo, pp. 395–397. Techniques utilizing three or more cameras have also been proposed. The techniques utilizing three or more cameras are described in, for example, "Object Detection Using Multiview Stereo Images" by Omori and Morishita, SICE collected papers, Vol. 18, 7, pp. 716–722, July 1982; "Recognition of Three-Dimensional Object Using Multiple Images" by Masahiko Taniuchida, Nikkei Mechanical, Vol.157, pp.82–91, January 1984; "Stereo Vision Corresponding Points Processing with Trinocular Images" by Itoh and Ishii, 29'th national meeting of Information Processing Society of Japan, 2M-3, September 1984; and "Trinocular Vision Stereo" by Ota and Ikeda, ibid., 2M-4. These techniques are referred to as the compound eye stereoscopic techniques.

However, the aforesaid proposed techniques have the practical drawbacks in that the apparatuses cannot be kept small in size and cheap in cost, and in that complicated adjustments are required with regard to the direction of each camera, the focusing point of each camera, and other factors.

Further, as different techniques for inputting parallax images, techniques for successively moving a single camera and thereby acquiring parallax images have been proposed. Such techniques are described in, for example, "Determining Three-Dimensional Structure From Image Sequences given by Horizontal and Vertical Moving Camera" by Yamamoto, collected papers of The Institute of Electronics and Communication Engineers of Japan, Vol. J69-D, No. 11, 1631; "Depth measurement by motion stereo" by R. Nevatia, Comput. Graphics Image Process., Vol. 9, pp. 23–214, 1976; "Depth from camera motion in a real world scene" by T. D. Williams, IEEE Trans. Pattern Anal. Mach. Intell., PAMI-2, pp. 511–516, 1980. With the proposed techniques, parallax images are obtained as time series continuous images. The proposed techniques are referred to as the motion stereoscopic techniques. With the motion stereoscopic techniques, parallax images seen from a markedly larger number of viewpoints than in the aforesaid compound eye stereoscopic techniques can be obtained. A plurality of parallax images, which have been sampled at a high density such that they may have only a slight parallax, are referred to as the continuous parallax images. With the motion stereoscopic techniques, since it is sufficient for only a single camera to be used, the problems with regard to the adjustments of the cameras with respect to one another, the matching of the camera positions, and the like, as in the aforesaid compound eye stereoscopic techniques can be avoided.

However, with the motion stereoscopic techniques, since the camera must be successively translated to positions having been set previously, it is necessary for a large-scale translation mechanism to be used. In general, a track, such as a rail, is constructed, or an accurate moving stage is located. Also, a drive device for translating the camera is used. Thus the motion stereoscopic techniques require complicated mechanisms, and therefore cannot be practical.

SUMMARY OF THE INVENTION

The primary object of the present invention is to provide a parallax image input apparatus having a simple constitution for obtaining parallax images seen from a plurality of viewpoints, the parallax images being used in detecting and restoring information, which concerns a depth direction of an object, and in reconstructing a stereoscopic image signal carrying the depth information.

The present invention provides a parallax image input apparatus for acquiring a plurality of images seen from different viewpoints, comprising:

i) an image forming means for forming images of the external world, ii) a parallax image pickup means for selectively imaging pieces of image information, which have passed through different positions in the image forming means, and converting the pieces of image information into image signals, and iii) an image recording means for recording the image signals, which have been obtained from the parallax image pickup means.

In the parallax image input apparatus in accordance with the present invention, the image forming means may be an optical lens, which forms an optical image.

Also, the parallax image pickup means may comprise:

a) a light amount control means for determining a light transmission range at a pupil plane of the optical lens, b) a light transmission range control means for the light amount control means, the light transmission range control means translating the light transmission range of the light amount control means in a direction parallel to the pupil plane of the optical lens, such that only the image information passing through a specific position in the image forming means may be selectively transferred, and c) an imaging means for imaging the image information, which has been transferred by the light amount control means, and converting the image information into an image signal.

By way of example, the light amount control means may be a light shutter. In such cases, the light transmission range control means may be a drive circuit for the light shutter.

Alternatively, the parallax image pickup means may comprise:

a) an image forming element group, which is composed of a plurality of image forming elements, each of the image forming elements forming an image of one of different portions of an image, which has been formed on a first image plane by the image forming means, on a second image plane, and b) an imaging means, which has a plurality of small regions located on the second image plane so as to correspond to the plurality of the image forming elements, each of the small regions of the imaging means having a single picture element area or a plurality of picture element areas, and converting the image information, the image of which has been formed, into an image signal.

In such cases, the imaging means may comprise a plurality of imaging elements, and each of the imaging elements may have an imaging plane, which corresponds to one of the small regions.

Also, in such cases, the image forming element group may be a lens array, which has refracting power in two-dimensional directions. Alternatively, the image forming element group may be a cylindrical lens array, which has refracting power only in a one-dimensional direction.

Further, the imaging means may simultaneously image a plurality of pieces of image information, which have passed through different positions in the image forming means. Alternatively, the imaging means may successively image a plurality of pieces of image information, which have passed through different positions in the image forming means.

Furthermore, the imaging means may be a photoelectric conversion imaging means (such as a CCD image sensor) or a photochemical reaction imaging means (such as silver halide photographic film).

Effects of the parallax image input apparatus in accordance with the present invention will be described hereinbelow.

Firstly, the principle of how the continuous parallax images are acquired will be described hereinbelow. FIG. 1 shows how images of the external world are formed on an imaging device by a single image forming lens optical system. In FIG. 1, the aperture, i.e. the pupil referred to in the field of optics, of an image forming lens 14 is open widely. In such cases, an image 1a of an object 1, an image 2a of an object 2, and an image 3a of an object 3 are formed on an imaging device 16. However, of the three images 1a, 2a, and 3a, the one which is in focus on the imaging device 16 is only the image 2a of the object 2, which is located on a focusing plane D of the imaging device 16.

The position of the object 1 is remoter from the image forming lens 14 than the focusing plane D of the imaging device 16 is. Therefore, an in-focus image id of the object 1 is formed at a position closer to the image forming lens 14 than the imaging device 16 is. As a result, the image 1a of the object 1, which is formed on the imaging device 16, is in the diverging condition and is unsharp.

The position of the object 3 is closer to the image forming lens 14 than the focusing plane D of the imaging device 16 is. Therefore, an in-focus image 3d of the object 3 is formed at a position remoter from the image forming lens 14 than the imaging device 16 is. As a result, the image 3a of the object 3, which is formed on the imaging device 16, is in the converging condition and is unsharp.

As in FIG. 1, FIG. 2 shows how images of the external world are formed on the imaging device 16 by a lens optical system. In FIG. 2, the pupil of the image forming lens 14 is limited to only the upper portion of the image forming lens 14 by a lens pupil aperture position control means (a light shutter) 15, having apertures 20 and is set to be markedly smaller than the pupil of the image forming lens 14 shown in FIG. 1. In such cases, as in FIG. 1, the image 2a of the object 2, which is located on the focusing plane D of the imaging device 16, is in focus.

In FIG. 2, the distance of shift of the in-focus image 1d of the object 1 from the imaging device 16 is the same as that in FIG. 1. Also, the distance of shift of the in-focus image 3d of the object 3 from the imaging device 16 is the same as that in FIG. 1. However, as illustrated in FIG. 2, the degree of unsharpness and the position of an image 1b of the object 1 on the imaging device 16 are different from those of the image 1a of the object 1 shown in FIG. 1. Also, the degree of unsharpness and the position of an image 3b of the object 3 on the imaging device 16 are different from those of the image 3a of the object 3 shown in FIG. 1. The image 1b of the object 1 is in the diverging condition on the imaging device 16 and is unsharp, but the degree of unsharpness of the image 1b is markedly lower than the degree of unsharpness of the image 1a, which is obtained when the pupil is fully open. A more important feature is that the image 1b on the imaging device 16 is located at a position corresponding to a lower portion of the unsharp image 1a, which is obtained when the pupil is fully open. This phenomenon occurs inevitably since the position of the pupil is set at the upper portion of the image forming lens 14, and since the focusing point of the image 1b of the object 1 is closer to the image forming lens 14 than the imaging device 16 is. As for the object 3, a reverse phenomenon occurs. The image 3b of the object 3 is in the converging condition on the imaging device 16 and is unsharp, but the degree of unsharpness of the image 3b is markedly lower than the degree of unsharpness of the image 3a, which is obtained when the pupil is fully open. Also, the image 3b on the imaging device 16 is located at a position corresponding to an upper portion of the unsharp image 3a, which is obtained when the pupil is fully open. This phenomenon occurs inevitably since the position of the pupil is set at the upper portion of the image forming lens 14, and since the focusing point of the image 3b of the object 3 is remoter from the image forming lens 14 than the imaging device 16 is.

FIG. 3 shows the condition of image formation, which occurs when the size of the pupil of the image forming lens 14 is limited to the same size as that in FIG. 2, and the position of the pupil is translated from the upper portion of the image forming lens 14 shown in FIG. 2 to a lower portion of the image forming lens 14. In such cases, the degrees of unsharpness of an image 1c of the object 1, an image 2c of the object 2, and an image 3c of the object 3, which images are formed on the imaging device 16, are the same as those in FIG. 2. However, the position of the image 1c of the object 1 on the imaging device 16 is reverse to the position of the image 1b of the object 1 shown in FIG. 2. Also, the position of the image 3c of the object 3 on the imaging device 16 is reverse to the position of the image 3b of the object 3 shown in FIG. 2. Specifically, the image 1c of the object 1 is located at a position corresponding to an upper portion of the unsharp image 1a, which is obtained when the pupil is fully open. Also, the image 3c of the object 3 is located at a position corresponding to a lower portion of the unsharp image 3a, which is obtained when the pupil is fully open. This phenomenon occurs inevitably due to the relationship between the focusing point and the optical path.

To sum up, in cases where the size of the aperture of the pupil of the image forming lens 14 is limited, and the position of the aperture of the pupil is translated from the upper portion of the image forming lens 14 to the lower portion of the image forming lens 14, the results described below are obtained. Specifically, as for the object 2 which is located such that the focusing point of its image and the position of the imaging device 16 coincide with each other, no change occurs in its image. However, as for each of the object 1 and the object 3, the position of the object image on the imaging device 16 changes. Also, the distance, over which the image position changes, and the direction, in which the image position changes, are determined by the relationship between the position of each of the objects 1, 2, and 3 and the position of the focal plane.

The aforesaid phenomenon will hereinbelow be described from the view point of the images, which are obtained on the imaging device 16. In each of the conditions shown in FIGS. 1, 2, and 3, the imaging device 16 receives the patterns of light (received light images) described below.

Specifically, in the condition of FIG. 1, in which the pupil is widely open, the received light images shown in FIG. 4A are obtained. In this condition, the image 1a of the object 1 and the image 3a of the object 3 are markedly unsharp.

In the condition of FIG. 2, in which the pupil is open at the upper portion of the image forming lens 14, the received light images shown in FIG. 4B are obtained. In this condition, the image 1b of the object 1 and the image 3b of the object 3 are slightly unsharp. Also, the position of the image 1b shifts to one side of the range of unsharpness of the image 1a, which is obtained when the pupil is widely open. The position of the image 3b shifts to one side of the range of unsharpness of the image 3a, which is obtained when the pupil is widely open.

In the condition of FIG. 3, in which the pupil is open at the lower portion of the image forming lens 14, the received light images shown in FIG. 4C are obtained. In this condition, the image 1c of the object 1 and the image 3c of the object 3 are slightly unsharp. Also, the position of the image 1c shifts to one side of the range of unsharpness of the image 1a, which is obtained when the pupil is widely open. The position of the image 3c shifts to one side of the range of unsharpness of the image 3a, which is obtained when the pupil is widely open. Further, the direction, in which the position of the image 1c shifts, is reverse to the direction, in which the position of the image 1b shifts when the pupil is open at the upper portion of the image forming lens 14. The direction, in which the position of the image 3c shifts, is reverse to the direction, in which the position of the image 3b shifts when the pupil is open at the upper portion of the image forming lens 14.

How the received light images described above are obtained will hereinbelow be described qualitatively.

The received light images shown in FIG. 4B, which are obtained when the pupil is open at the upper portion of the image forming lens 14, are constituted of only the light, which passes through the pupil at the upper portion of the image forming lens 14. Specifically, the received light images, which are obtained in this condition, are approximately identical with the images, which will be obtained when the three objects are seen from the position of the pupil at the upper portion of the image forming lens 14.

The received light images shown in FIG. 4C, which are obtained when the pupil is open at the lower portion of the image forming lens 14, are constituted of only the light, which passes through the pupil at the lower portion of the image forming lens 14. Specifically, the received light images, which are obtained in this condition, are approximately identical with the images, which will be obtained when the three objects are seen from the position of the pupil at the lower portion of the image forming lens 14. FIG. 5 is an explanatory view showing the thus obtained effects.

The received light images shown in FIG. 4A, which are obtained when the pupil is open over the entire area of the image forming lens 14, are constituted of the light, which passes through every portion of the image forming lens 14. Specifically, it may be considered that the received light images, which are obtained in this condition, result from superposition of all of the images, which will be obtained when the three objects are seen from every position in the image forming lens 14.

As described above, in cases where the images are obtained on the imaging device 16 by limiting the size of the pupil of the image forming lens 14 and translating the position of the pupil, the obtained images are approximately identical with the images, which will be obtained when the three objects are seen from each position of the pupil. Therefore, the thus obtained images have parallaxes which vary little by little. Specifically, the group of the received light images serves as a plurality of parallax images (continuous parallax images), which carry the information useful for detecting and restoring the information concerning the depth directions of the objects. The parallax image input apparatus in accordance with the present invention operates on the principle described above.

The continuous parallax images obtained on the principle described above have the characteristics such that the position of the image of the object 2, which is located on the focal plane, may not change. By virtue of the characteristics, even if the number of the sample images is small, no jump will occur in the translation of the object image among the continuous parallax images. Therefore, for the depth calculations, simple algorithms may be utilized. In order for the same effects to be obtained with the motion stereoscopic techniques described above, very accurate, complicated control for the optical axis of the camera must be carried out. On the other hand, with the parallax image input apparatus in accordance with the present invention, wherein theoretically little change occurs in the position of the image of the target object, which is located on the focal plane, the effects can be obtained easily.

As an aid in clarifying the simplicity of the parallax image input apparatus in accordance with the present invention, constitutions necessary for obtaining the aforesaid effects with the motion stereoscopic techniques will be described hereinbelow.

With the motion stereoscopic techniques, a camera is translated, and parallax images are thereby recorded. In such cases, it is necessary for the optical axis of the camera to be controlled. Methods of controlling the optical axis of the camera may be classified into methods illustrated in FIGS. 6A and 7A. In the method illustrated in FIG. 6A, the optical axis of a camera 12 is translated in parallel. In the method illustrated in FIG. 7A, the optical axis of the camera 12 is controlled such that the optical axis may be directed to the same point during the translation of the camera 12. (It may be considered that, in the control method of FIG. 6A, the optical axis of the camera 12 is directed to a point at infinity during the translation of the camera 12.)

The method of FIG. 6A, in which the optical axis of the camera 12 is translated in parallel, has the advantages in that the control is simple. However, with the parallel translation method of FIG. 6A, as illustrated in FIG. 6B, which shows the images obtained with the method of FIG. 6A, a large parallax occurs for an object, which is close to the camera 12, with respect to a certain distance of translation of the camera 12. As described above, the merit of the continuous parallax images is that no jump occurs in the translation of the object image due to the parallax among the continuous parallax images. This merit is an important condition for simplifying the algorithms for the restoration of the depth information. Therefore, such that the condition for simplifying the algorithms for the restoration of the depth information may be satisfied, i.e. such that the continuity among the parallax images may be obtained even for the object close to the camera 12, image sampling must be carried out at a sufficiently high density. Also, such that a sufficient parallax may be obtained for an object remote from the camera 12, the camera 12 must be translated over a long distance. Consequently, since the image sampling at a high density and the translation of the camera 12 over a long distance are required, a very large number of images must be sampled. In such cases, the number of image signals and the amount of calculation cannot be kept small. Thus the motion stereoscopic technique, in which the optical axis of the camera 12 is translated in parallel, has the drawbacks in that a very high sampling density (a very large number of images) is required.

With the method of FIG. 7A, in which the optical axis of the camera 12 is rotated, it is sufficient for a small necessary number of continuous parallax images to be obtained in the vicinity of the target object. In the method of FIG. 7A, the camera 12 is translated while its orientation is being controlled such that its optical axis may be directed to the same point. Therefore, the method of FIG. 7A has the drawback in that a large-scale mechanism is required to control the translation of the camera 12. However, as illustrated in FIG. 7B, which shows the images obtained with the method of FIG. 7A, little change occurs with the position of an image 2a of an object 2, which is located at the center point of the rotation of the optical axis of the camera 12, and changes occur only with the position of an image 1a of an object 1, which is remoter from the camera 12 than the center point of the rotation of the optical axis of the camera 12 is, and with the position of an image 3a of an object 3, which is closer to the camera 12 than the center point of the rotation of the optical axis of the camera 12 is. By virtue of such characteristics, when the camera 12 is translated, the continuity can be kept easily in the translation of the images in the vicinity of the target object due to the parallax when the camera 12 is translated.

Also, in the method in which the optical axis of the camera 12 is rotated, the direction, in which the parallax occurs with the object 3 closer to the camera 12 than the center point of the rotation of the optical axis of the camera 12 is, and the direction, in which the parallax occurs with the object 1 remoter from the camera 12 than the center point of the rotation of the optical axis of the camera 12 is, are reverse to each other. Specifically, the image 3a of the object 3, which is closer to the camera 12 than the center point of the rotation of the optical axis of the camera 12 is, is translated reversely to the direction in which the camera 12 is translated. Also, the image 1a of the object 1, which is remoter from the camera 12 than the center point of the rotation of the optical axis of the camera 12 is, is translated in the same direction as the direction in which the camera 12 is translated. Therefore, by merely detecting whether the direction, in which an image is translated, is the same as or reverse to the direction in which the camera 12 is translated, it is possible to immediately detect whether an object is located at a position closer to or remoter from the camera 12 than is center point of the rotation of the optical axis of the camera 12.

As described above, the optical axis rotating type of motion stereoscopic technique, in which the camera 12 is translated while its orientation is being controlled such that its optical axis may be directed to the same point, is advantageous over the optical axis fixing type of motion stereoscopic technique in that the continuous parallax images suitable for the subsequent image processing can be obtained easily. However, as described above, the optical axis rotating type of motion stereoscopic technique has the drawbacks in that a large-scale mechanism is required to translate the camera 12 while the direction of the optical axis of the camera 12 is being controlled. Therefore, the optical axis rotating type of motion stereoscopic technique is not appropriate for use in practice.

In an apparatus for inputting continuous parallax images, it may be considered to employ the ordinary compound eye stereoscopic technique, in which many cameras are utilized. FIG. 8 shows the compound eye stereoscopic technique, in which many cameras are located such that their optical axes may be directed to the same point. However, as illustrated in FIG. 8, it is very difficult and is not practicable to locate many cameras 12', 12', . . . such that their optical axes may be directed to the same point (in this case, the position of an object 2). Also, it is almost impossible to set and alter the target point to a desired point and to control the orientations of the cameras 12', 12', . . . when necessary.

A human being having two eyeballs is provided with the vergence mechanism for controlling such that each of the two eyes may catch the same object at the center of the visual field. (As for the vergence, reference may be made to "Pencil of Light" by Tsuruta, New Technical Communications, pp. 31–33; and "Visual Perception Mechanism related to Binocular Stereo Vision Technology" by Hitoshi Ohzu, transactions of The Japan Society for Precision Engineering, Vol.54, 5–11, 1988.) Specifically, when the human being merely turns his consciousness to an object of interest, he can naturally focus upon the object of interest and can direct the optical axis of the two eyes to the object of interest. As a result, the human being can acquire the input parallax images, which are ideal for the stereoscopic vision, such that the image of the object of interest may be stationary on the parallax images, and such that the image of the object of interest may be in focus. It is presumed that the ideal parallax images give a powerful aid to the cerebrum in extracting and processing the depth information.

The human being acquires the aforesaid functions without undergoing special training and achieves the functions very easily. The ability of the human being depends markedly upon the evolution and heredity of the living being and the action of the advanced mechanism, such as learning. It is a subject of great difficulty to realize the functions equivalent to those of the human being. Practicable theory and mechanisms for the subject have not yet been developed.

The parallax image input apparatus in accordance with the present invention is provided with the parallax image pickup means for selectively imaging the pieces of image information, which have passed through different positions in the image forming means, and converting the pieces of image information into image signals. Therefore, the continuous parallax images obtained with the parallax image input apparatus in accordance with the present invention have the same characteristics as those of images, which are obtained with the aforesaid optical axis rotating type of motion stereoscopic technique, wherein a camera is translated while the orientation of the camera is being controlled such that the optical axis of the camera may be directed to the same point. Specifically, the continuous parallax images obtained with the parallax image input apparatus in accordance with the present invention have the characteristics such that (1) little change occurs with the position of an image of an object, which is located in the vicinity of a target object, and changes occur only with the position of an image of an object, which is remoter from the parallax image input apparatus than the target object is, and with the position of an image of an object, which is closer to the parallax image input apparatus than the target object is, and (2) the direction, in which the parallax occurs with the object closer to the parallax image input apparatus than the target object is, and the direction, in which the parallax occurs with the object remoter from the parallax image input apparatus than the target object is, are reverse to each other. As a result, as in the optical axis rotating type of motion stereoscopic technique, sufficient continuity among the parallax images can be obtained, and continuous parallax images of a practicable sampling density (a practicable number of images) can be obtained.

The parallax image input apparatus in accordance with the present invention is advantageous over the optical axis rotating type of motion stereoscopic technique in that, in cases where an image forming lens is employed as the image forming means, the image of an object, which is located on the focal plane of the image forming lens, automatically stands stationary on the imaging plane. By virtue of such characteristics, it is unnecessary for a large-scale orientation control mechanism as in the motion stereoscopic technique to be used. Also, since the continuous parallax images of the objects containing the object, which is located on the focal plane of the image forming lens, as a central object are obtained, from the view point of the principle of optical image formation, best possible images in focus can be obtained.

The parallax image input apparatus in accordance with the present invention operates on the principle, which is quite different from that of the human's optical axis control system for ingeniously controlling the motions of the two eyeballs. However, the effects of the parallax image input apparatus in accordance with the present invention in that, by merely focusing upon the object of interest, the image of the object of interest naturally stands stationary on the parallax images are identical with the effects of the excellent visual functions of the human being. The effects are ideal for the input parallax images for stereoscopic vision and give a powerful aid to the subsequent processing for extracting the depth information.

Further, with the parallax image input apparatus in accordance with the present invention, the continuous parallax images can be obtained by using a single image forming means and a single parallax image pickup means. Therefore, it is not necessary to use a plurality of cameras or to translate a camera as in the conventional techniques. Thus the parallax image input apparatus in accordance with the present invention is simple in constitution and is appropriate for use in practice.

BRIEF DESCRIPTION OF THE DRAWINGS

FIG. 12 is an explanatory view showing a truncated circular cone-shaped space, which extends between a pupil plane of an image forming lens and a real image of a microlens, FIG. 13 is an explanatory view showing how an image of light coming from a point light source is formed at a position of a fourth microlens 25a from the bottom in cases where the point light source is located at the position of a real image on a focal plane, FIG. 14A is an explanatory view showing that, in cases where the image forming lens is looked at from the position of the fourth microlens 25a from the bottom, which is shown in FIG. 13, the light coming from the point light source is seen as spreading over the entire area of the pupil plane of the image forming lens, FIG. 14B is an explanatory view showing that, in cases where the image forming lens is looked at from the position of a microlens other than the microlens 25a, which is shown in FIG. 13, the light coming from the point light source is not seen in the pupil plane of the image forming lens, FIG. 15 is an explanatory view showing a light component radiated out of the point light source, which light component can impinge upon a microlens 25b, FIG. 16 is an explanatory view showing that a light component coming from the point light source, which light component follows an optical path passing through an image of a microlens 25c, travels to the side outward from the pupil of the image forming lens, FIG. 17A is an explanatory view showing how an image of the point light source is seen when the image forming lens is looked from the position of the microlens 25a, FIG. 17B is an explanatory view showing how an image of the point light source is seen when the image forming lens is looked from the position of the microlens 25b, FIG. 17C is an explanatory view showing that an image of the point light source is not seen when the image forming lens is looked from the position of the microlens 25c, FIG. 18 is an explanatory view showing a range of existence of radiating points of light, which can impinge upon a certain picture element in a small region of an imaging device, FIG. 19 is an explanatory view showing a region of existence of light source points, which constitute signals at lower end portions of images in an image group formed by microlenses.

DESCRIPTION OF THE PREFERRED EMBODIMENTS

The present invention will hereinbelow be described in further detail with reference to the accompanying drawings.

Firstly, basic functions of the parallax image input apparatus in accordance with the present invention will be described hereinbelow.

Figure 1:
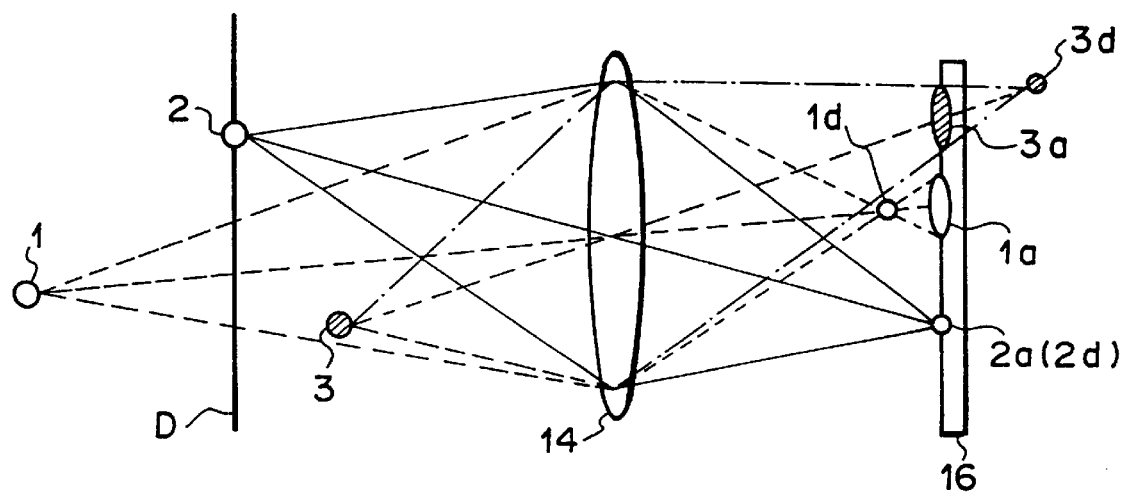
FIG. 1 is an explanatory view showing how images of the external world are formed by a single image forming lens optical system in cases where a pupil is fully open.
Figure 2:
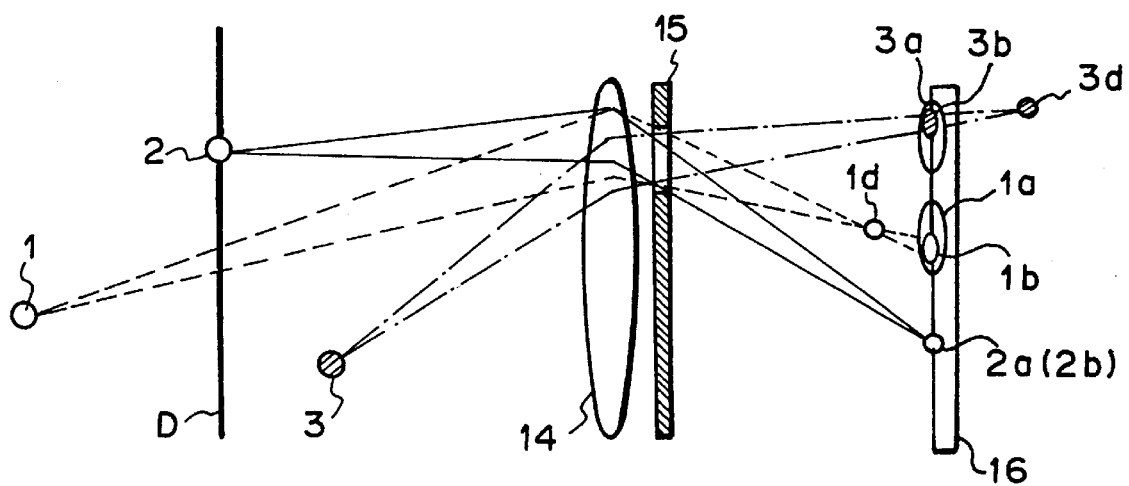
FIG. 2 is an explanatory view showing how images of the external world are formed by the single image forming lens optical system in cases where the size of the pupil is reduced (such that light may pass through only an upper portion)
Figure 3:
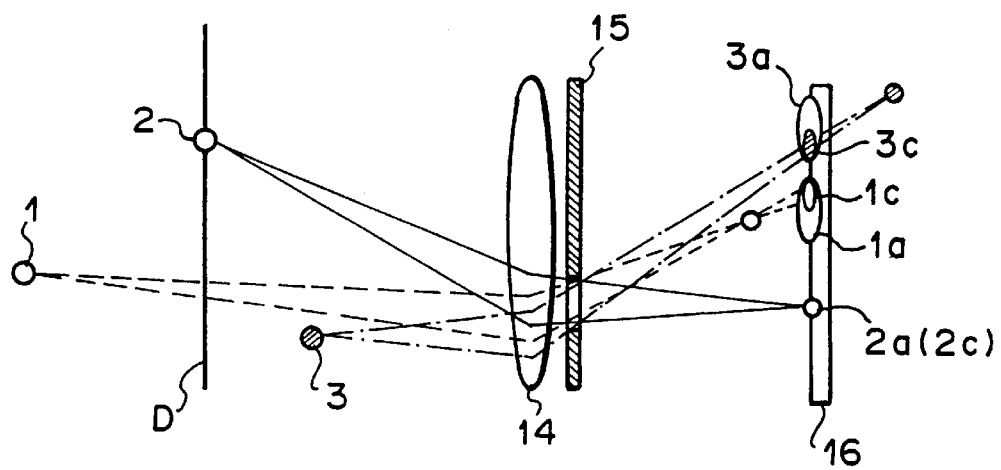
FIG. 3 is an explanatory view showing how images of the external world are formed by the single image forming lens optical system in cases where the size of the pupil is reduced and the position of the pupil is changed from the position shown in FIG. 2 (such that light may pass through only a lower portion)
Figure 4A:
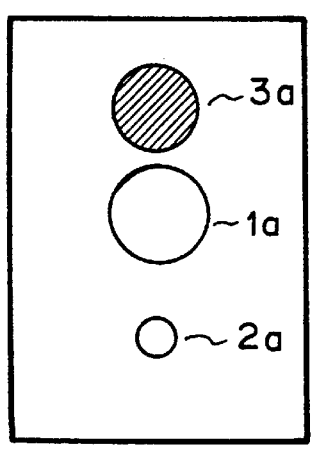
FIG. 4A is an explanatory view showing how received light images are obtained in cases where the pupil is fully open.
Figure 4B:
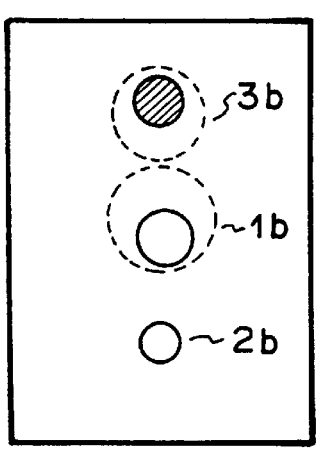
FIG. 4B is an explanatory view showing how received light images are obtained in cases where the pupil is open at only the upper portion of the image forming lens.
Figure 4C:
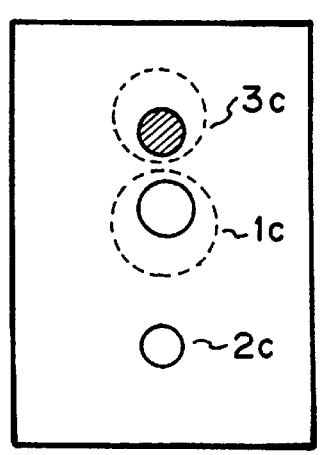
FIG. 4C is an explanatory view showing how received light images are obtained in cases where the pupil is open at only the lower portion of the image forming lens.
Figure 5:
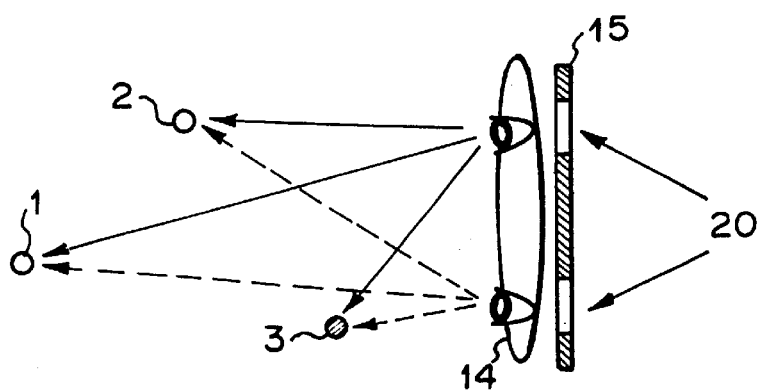
FIG. 5 is an explanatory view showing effects obtained from the imaging carried out by limiting the size of the pupil of the image forming lens and translating the position of the aperture of the pupil.
Figure 6A:
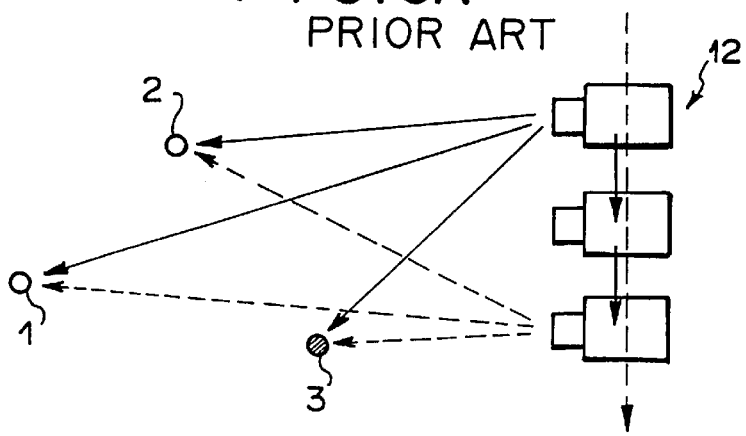
FIG. 6A is an explanatory view showing a motion stereoscopic image recording technique, in which an optical axis of a camera is translated in parallel.
Figure 6B:
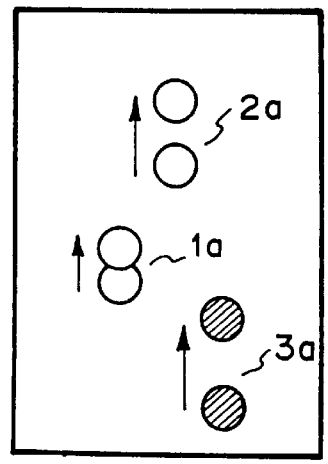
FIG. 6B is an explanatory view showing how images are obtained with the motion stereoscopic image recording technique of FIG. 6A.
Figure 7A:
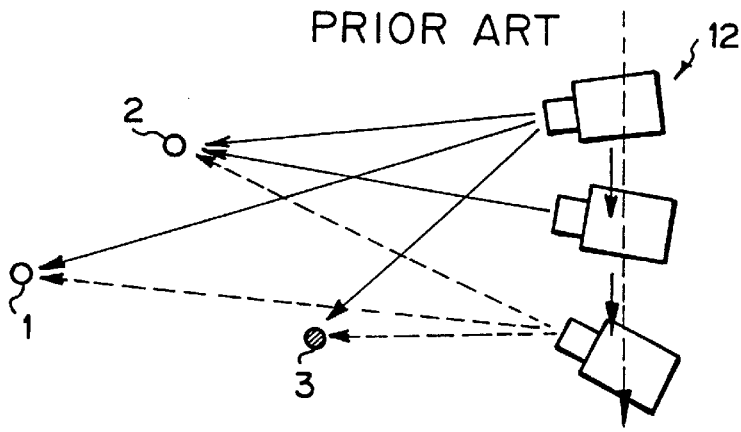
FIG. 7A is an explanatory view showing a motion stereoscopic image recording technique, in which an optical axis of a camera is rotated.
Figure 7B:
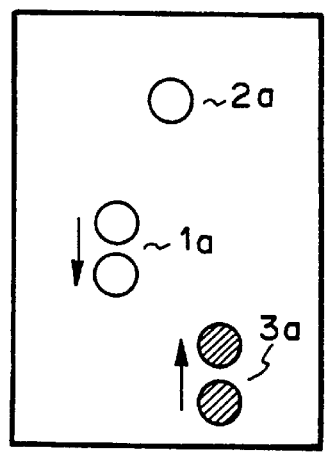
FIG. 7B is an explanatory view showing how images are obtained with the motion stereoscopic image recording technique of FIG. 7A.
Figure 8:
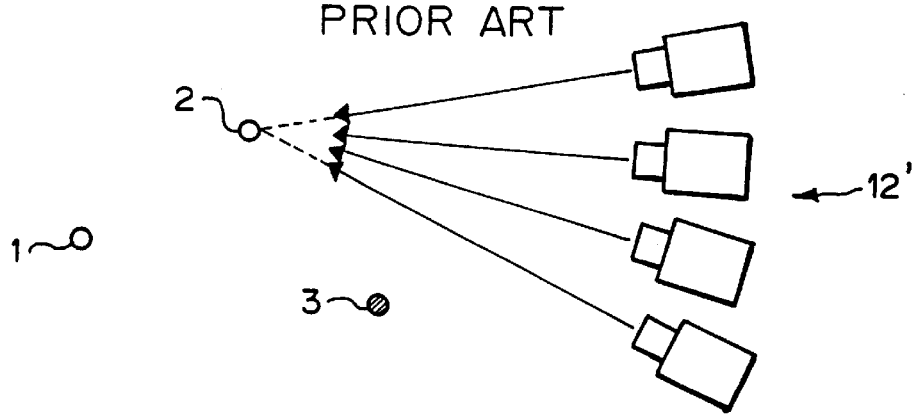
FIG. 8 is an explanatory view showing a compound eye stereoscopic technique, in which many cameras are located such that their optical axes may be directed to the same point.
Figure 9:
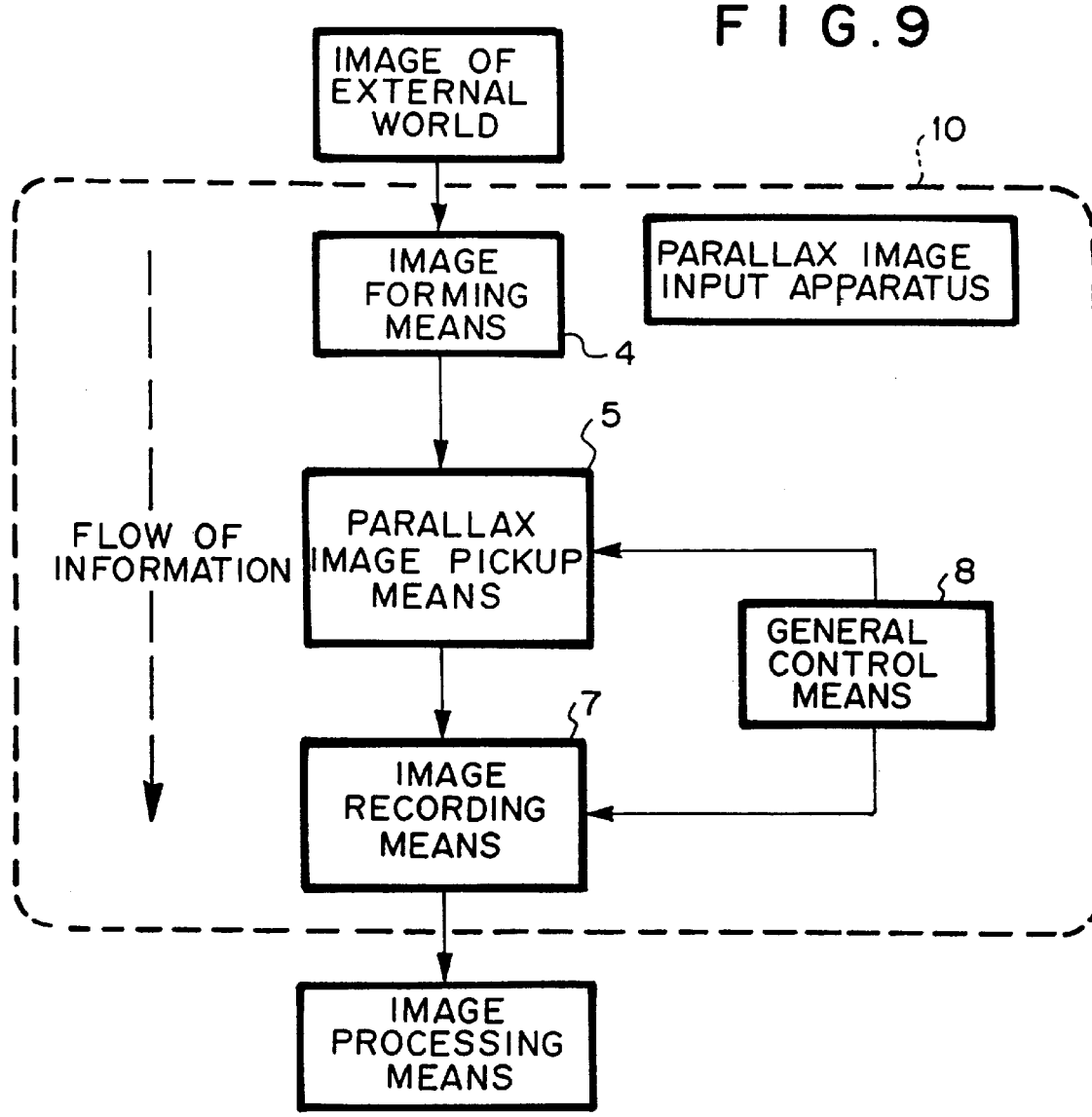
FIG. 9 is a block diagram showing functions of the parallax image input apparatus in accordance with the present invention.

FIG. 9 shows basic functions of the parallax image input apparatus in accordance with the present invention. As illustrated in FIG. 9, a parallax image input apparatus 10 in accordance with the present invention comprises an image forming means 4 for forming images of the external world. The parallax image input apparatus 10 also comprises a parallax image pickup means 5 for controlling an input position for images in the image forming means 4, detecting the images which have been formed by the image forming means 4, and converting the images into image signals. The parallax image input apparatus further comprises an image recording means 7 for recording the image signals, which have been obtained from the parallax image pickup means 5, and a general control means 8 for controlling the operations of the parallax image pickup means 5 and the image recording means 7.

Embodiments of the parallax image input apparatus in accordance with the present invention will be described hereinbelow.

<First embodiment>

Figure 10:
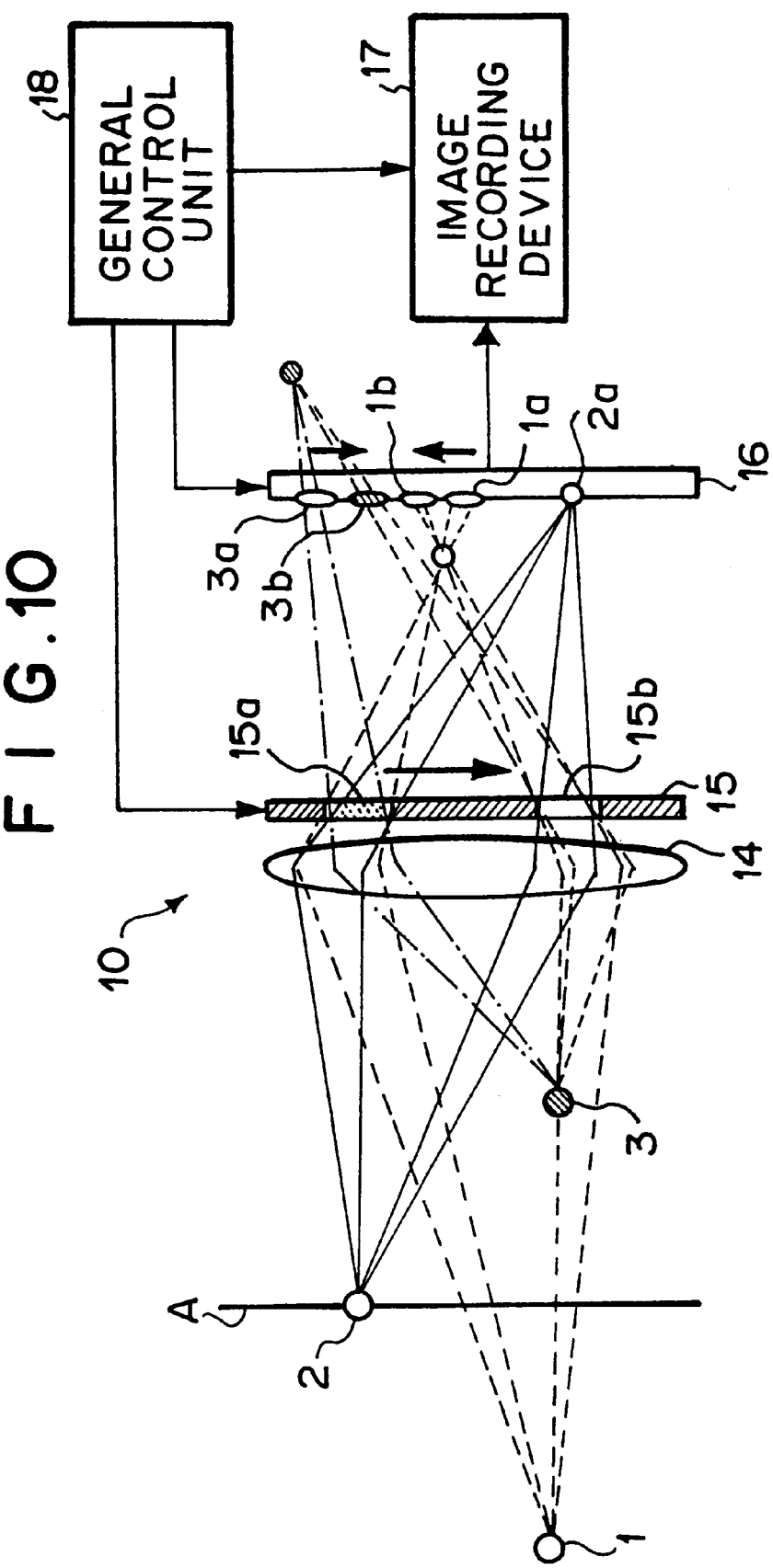
FIG. 10 is an explanatory view showing a first embodiment of the parallax image input apparatus in accordance with the present invention.

FIG. 10 shows a parallax image input apparatus 10, which serves as a first embodiment of the parallax image input apparatus in accordance with the present invention. The parallax image input apparatus 10 comprises an image forming lens 14 for forming the images of the external world, and a light shutter 15, which is located in the vicinity of the pupil plane of the image forming lens 14 and in which the position of an aperture can be controlled. The parallax image input apparatus 10 also comprises an imaging device 16, which images the image information having been acquired with the image forming lens 14 and the light shutter 15 and converts the image information into image signals. The imaging device 16 may be constituted of a CCD image sensor, or the like. The parallax image input apparatus 10 further comprises an image recording device 17 for recording the image signals, which have been obtained from the imaging device 16, and a general control unit 18 for controlling the light shutter 15, the imaging device 16, and the image recording device 17 in association with one another.

The image forming lens 14 of the parallax image input apparatus 10 corresponds to the image forming means 4 shown in FIG. 9. The light shutter 15 and the imaging device (such as the CCD image sensor) 16 correspond to the parallax image pickup means 5 shown in FIG. 9. The image recording device 17 corresponds to the image recording means 7 shown in FIG. 9. The general control unit 18 corresponds to the general control means 8 shown in FIG. 9.

An adjustment is made such that the focal point of the image forming lens 14 may coincide with the most central object (in this case, an object 2) among target objects 1, 2, and 3. In FIG. 10, A represents a focal plane of the image forming lens 14. Continuous parallax images can be acquired by changing (scanning) the position of the aperture of the light shutter 15 little by little, detecting the images by the imaging device 16, and successively recording the thus obtained image signals by the image recording device 17. When the position of the aperture of the light shutter 15 is changed from a position 15a to a position 15b along the direction indicated by the arrow, an image of the object 1, which image is formed on the imaging device 16, translates from 1a to 1b, and an image of the object 3, which image is formed on the imaging device 16, translates from 3a to 3b. (No change occurs in the position of an image 2a of the object 2.) The scanning of the aperture of the light shutter 15 may be carried out in a one-dimensional direction or in two-dimensional directions. In cases where the parallax image input apparatus is constituted such that the relationship between the recorded image and the position of the aperture of the light shutter 15 may be clear, an arbitrary scanning pattern may be employed.

<Second embodiment>

A second embodiment of the parallax image input apparatus in accordance with the present invention will be described hereinbelow with reference to FIG. 11.

Figure 11:
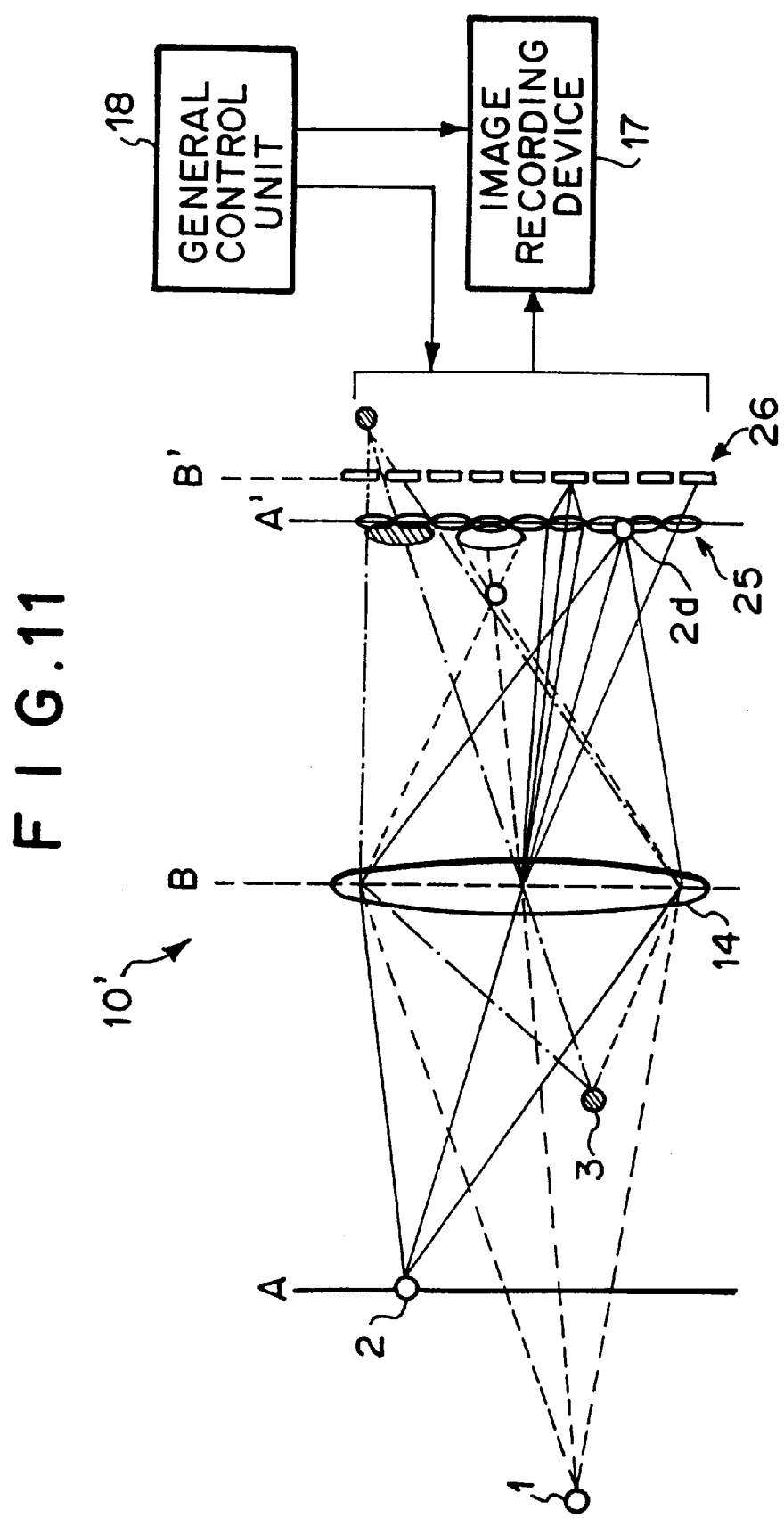
FIG. 11 is an explanatory view showing a second embodiment of the parallax image input apparatus in accordance with the present invention.

With reference to FIG. 11, a parallax image input apparatus 10', which serves as the second embodiment of the parallax image input apparatus in accordance with the present invention, comprises the image forming lens 14 for forming the images of the external world, and a microlens array 25 for controlling the input position for images in the image forming lens 14. The parallax image input apparatus 10' also comprises an imaging device 26, which images the image information having been acquired with the image forming lens 14 and the microlens array 25 and converts the image information into image signals. The imaging device 26 may be constituted of a CCD image sensor, or the like. The parallax image input apparatus 10 further comprises the image recording device 17 for recording the image signals, which have been obtained from the imaging device 26, and the general control unit 18 for controlling the operations of the imaging device 26 and the image recording device 17.

The image forming lens 14 of the parallax image input apparatus 10' corresponds to the image forming means 4 shown in FIG. 9. The microlens array 25 and the imaging device (such as the CCD image sensor) 26 correspond to the parallax image pickup means 5 shown in FIG. 9. The image recording device 17 corresponds to the image recording means 7 shown in FIG. 9. The general control unit 18 corresponds to the general control means 8 shown in FIG. 9.

The focal point of the image forming lens 14 is adjusted such that an in-focus image of the most central object may be formed on the microlens array 25. Specifically, as illustrated in FIG. 11, in cases where the object 2 is regarded as being the most central object, the object 2 is located on an image forming lens focal plane A, which lies on the side leftward from the image forming lens 14, and an in-focus image 2*d* of the object 2 is obtained on an image forming lens focal plane A', which lies on the side rightward from the image forming lens 14. In such cases, the microlens array 25 is located on the image forming lens focal plane A'. Also, with respect to the relationship with the focal point of the microlens array 25, the position of the pupil of the image forming lens 14 is set to coincide with a microlens focal plane B, which lies on the side leftward from the microlens array 25, and the imaging device 26 is located on a microlens focal plane B', which lies on the side rightward from the microlens array 25.

The imaging device 26 is processed as an array of small regions, each of which corresponds to one of the microlenses of the microlens array 25.

The number of the thus obtained parallax image coincides with the number of the elements of the microlens array 25 and the number of the small regions of the imaging device 26.

How the second embodiment operates will be described hereinbelow. In the parallax image input apparatus 10', the operation for acquiring the continuous parallax images is accomplished by the functions of the microlens array 25 for spatial separation of the image of the pupil of the image forming lens 14. As illustrated in FIG. 12, in cases where the positions of the image forming lens 14 and the microlens array 25 satisfy the condition described above, only the light coming from a light point (a point light source) lying in a truncated circular cone-shaped space, which is netted in FIG. 12 and extends between the pupil plane of the image forming lens 14 and a real image 25*a*' of a microlens 25*a*, the real image 25*a*' being formed on the image forming lens focal plane A, can impinge upon the microlens 25*a* (i.e., the fourth microlens from the bottom) of the microlens array 25.

Firstly, how images are obtained in cases where, as illustrated in FIG. 13, a point light source 31 is located at the position of the real image 25*a*' of the microlens 25*a*, the real image 25*a*' being formed on the image forming lens focal plane A, will be described hereinbelow. In this case, the microlens 25*a*, which is the fourth microlens from the bottom, is taken as an example. As illustrated in FIG. 13, the light having been radiated out of the point light source 31 diverges and impinges upon the pupil plane of the image forming lens 14. The direction of the optical path of the light having been radiated out of the point light source 31 is bent by the action of the image forming lens 14, and the light converges toward the microlens 25*a*. Since the image forming lens focal plane A and the image forming lens focal plane A' have the focusing relationship, the image of the point light source 31 is formed at the position of the fourth microlens 25*a* from the bottom. Specifically, the light, which has passed through every portion of the image forming lens 14, impinges upon the fourth microlens 25*a* from the bottom. Therefore, as illustrated in FIG. 14A, if the image forming lens 14 is looked at from the position of the fourth microlens 25*a* from the bottom, the light coming from the point light source 31 can be seen as spreading over the entire area of the pupil plane of the image forming lens 14. The light coming from the point light source 31 does not impinge upon the microlenses other than the microlens 25*a*. Therefore, as illustrated in FIG. 14B, in cases where the image forming lens 14 is looked at from the position of a microlens other than the microlens 25*a*, the light coming from the point light source 31 is not seen in the pupil plane of the image forming lens 14, and a black image is obtained on the corresponding small region of the imaging device 26.

Secondly, how images are obtained in cases where the point light source 31 is located at a position different from the position of the real image of the microlens, the real image 25*a*' being formed on the image forming lens focal plane A, will be described hereinbelow with reference to FIGS. 15 and 16. In such cases, of the light having been radiated out of the point light source 31, only the light component, which follows the optical path passing through the range of the real image of a microlens of the microlens array 25, the real image being formed on the image forming lens focal plane A, can impinge upon the microlens. For example, in FIG. 15, a light component radiated out of the point light source 31, which light component can impinge upon a microlens 25*b*, is illustrated with the hatched region. In such cases, as illustrated in FIG. 17B, if the pupil plane is looked from the position of the microlens 25*b* on the image forming lens focal plane A' shown in FIG. 15, an unsharp image 31*b* of the point light source 31 can be seen at only an upper portion of the pupil plane.

Also, as illustrated in FIG. 17A, in cases where the pupil plane is looked at from the position of the microlens 25*a*, an unsharp image 31*a* of the point light source 31 can be seen at an approximately middle portion of the pupil plane. However, as illustrated in FIG. 16, as for a microlens 25*c*, the point light source 31 lies on the side outward from a truncated circular cone-shaped region, which shows the range of light capable of impinging upon the microlens 25*c*. Therefore, of the light having been radiated out of the point light source 31, a light component (in the region hatched in FIG. 16), which follows an optical path passing through the image of the microlens 25*c*, travels to the side outward from the pupil of the image forming lens 14. Accordingly, the light component cannot pass through the image forming lens 14. In such cases, as illustrated in FIG. 17C, if the image forming lens 14 is looked at from the position of the microlens 25*c*, the light coming from the point light source 31 (unsharp images 31*c*) is not seen in the pupil plane of the image forming lens 14, and a black image is obtained on the small region of the imaging device 26 corresponding to the microlens 25*c*.

What information is carried by the image, which is formed on the imaging device 26 by each microlens of the microlens array 25, will be described hereinbelow with reference to FIG. 18. The image formed on the imaging device 26 is the image of the pupil plane of the image forming lens 14. Therefore, the optical path of the light capable of impinging upon the position of each picture element of the image formed on the imaging device 26 is determined naturally in accordance with the principle of the geometric optics. For example, as illustrated in FIG. 18, of the light components coming from the radiating points lying on the light incidence side leftward from the image forming lens 14, the light components, which are capable of impinging upon a certain picture element 26*a* located at a lower portion of a certain small region of the imaging device 26, are limited to those which come from radiating points lying in the netted region on the side leftward from the image forming lens 14. A more important feature is that, of the light components capable of impinging upon the picture element 26*a*, the light component which actually impinges upon the picture element 26*a* is only the one which travels along the optical path in the netted region.

Therefore, for example, a picture element at the middle portion of the image, which is formed on the imaging device 26 by each microlens of the microlens array 25, is the one which is constituted of a light component having passed through the middle portion of the image forming lens 14.

Also, a picture element at a peripheral portion of the image, which is formed on the imaging device 26 by each microlens of the microlens array 25, is the one which is constituted of a light component having passed through a peripheral portion of the image forming lens 14. Accordingly, each of the images formed by the microlens array 25 is the one which is obtained by spatially separating the light signals coming to each microlens, the spatial separation being effected in accordance with the light passage positions in the pupil plane of the image forming lens 14.

Specifically, from the group of the images of the pupil plane, which images are formed on the imaging device 26 by the microlenses, only the signals at specific positions in the images may be sampled. An image may then be reconstructed from the sampled signals. In this manner, an image can be obtained which is composed of only the light signals having passed through the same light passage position in the pupil plane of the image forming lens 14.

For example, only the signals at middle portions of the images formed by the microlenses may be collected, and a single image may be reconstructed from the collected signals. As a result, an image can be obtained which is composed of only the light signals having passed through the middle portion of the pupil plane of the image forming lens 14. Also, only the signals at lower portions of the images formed by the microlenses may be collected, and a single image may be reconstructed from the collected signals. As a result, an image can be obtained which is composed of only the light signals having passed through the upper portion of the pupil plane of the image forming lens 14. In this manner, only the signals at specific positions in the small images formed by the microlenses can be sampled, and an image can be reconstructed from the sampled signals.

By way of example, FIG. 19 shows a region of existence of light source points, which constitute signals at lower end portions of images in an image group 14' formed by the microlenses of the microlens array 25. The signals at the lower end portions of the images in the image group 14' formed by the microlenses of the microlens array 25 are constituted of only the light having passed through the upper end portion of the pupil plane of the image forming lens 14. When the optical paths on the side upstream from the image forming lens 14 are followed, it will be understood that the viewpoint is set at the upper end portion of the image forming lens 14, and that the light signal components coming along various directions from the external world and passing through the positions of images 25', 25', . . . of the microlenses of the microlens array 25, which images are formed by the image forming lens 14, are received. Therefore, the distribution of the signals, which are obtained by arraying the light signal components in order, is equivalent to the distribution of light intensity (i.e., the image) of the external world, which is obtained when the viewpoint is set at the upper end portion of the image forming lens 14.

As described above, the image, which is reconstructed by sampling the signals at the corresponding positions in the images formed on the imaging device 26, is equivalent to the image of the external world, which image is obtained when the viewpoint is set at a position on the image forming lens 14 corresponding to the sampling positions. Specifically, the reconstructed images, which are constituted of the signal components sampled at different sampling positions in the images formed on the imaging device 26, have the parallax with respect to one another. In cases where the sampling is carried out at a sufficiently high density on the images formed on the imaging device 26, and images are reconstructed from the sampled signal components, the reconstructed images can be obtained such that the parallax may vary little by little among them. Specifically, the continuous parallax images can be obtained in this manner.

Figure 20:
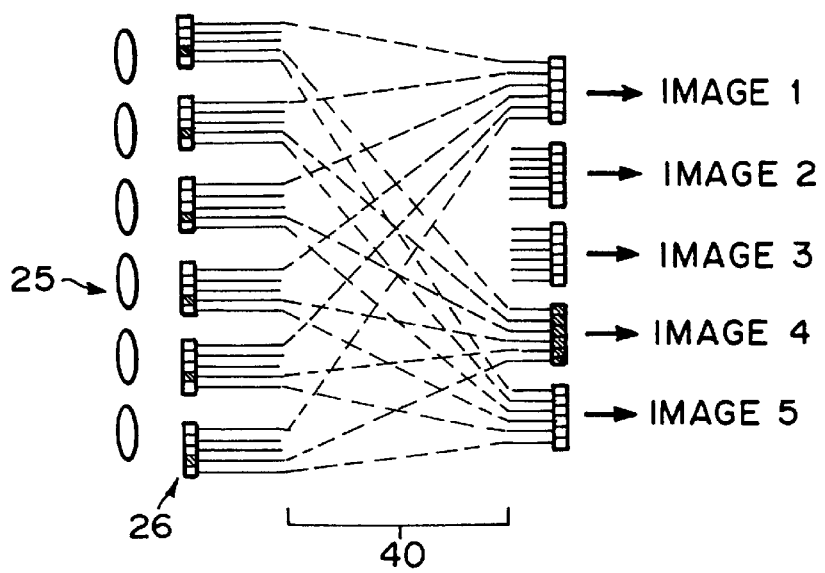
FIG. 20 is an explanatory view showing an example of a sampling method, in which a signal distributing means is utilized, in the second embodiment of the parallax image input apparatus in accordance with the present invention.

Additionally, in this parallax image input apparatus, as described above, the signals necessary for constructing the image seen from each viewpoint are spatially independent from one another. Therefore, as illustrated in FIG. 20, as the sampling means for each image, a signal distributing means 40 having a plurality of signal lines may be employed. In such case, a plurality of images can be acquired simultaneously.

The ability of simultaneously acquiring a plurality of parallax images has the features in that the time required to acquire the images can be kept short and in that, since a sampling time lag does not occur among the parallax images, blur does not occur even for a quickly moving object. Also, since a scanning mechanism need not be used, the constitution of the parallax image input apparatus can be kept simple. However, in the second embodiment, the image plane of the image forming lens 14 is divided by the microlens array 25. Therefore, from the view point of the spatial resolution, the first embodiment, in which the entire image information is acquired on a single parallax image, is more advantageous than the second embodiment.

Figure 21:
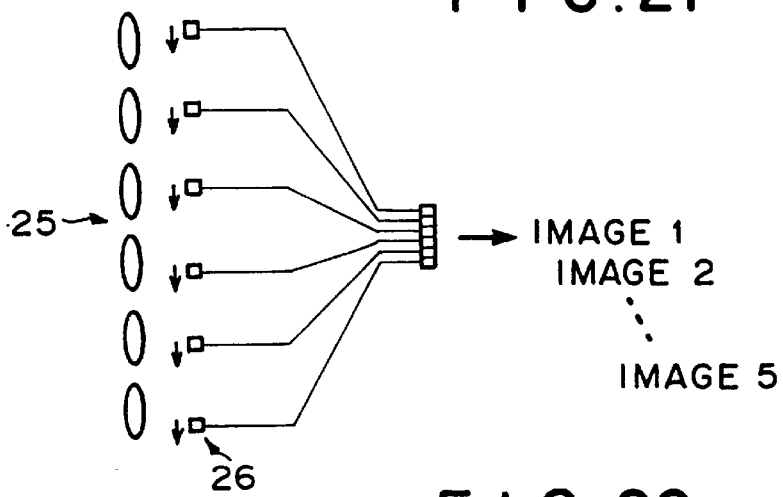
FIG. 21 is an explanatory view showing a different example of a sampling method, in which light receiving elements are moved, in the second embodiment of the parallax image input apparatus in accordance with the present invention.
Figure 22:
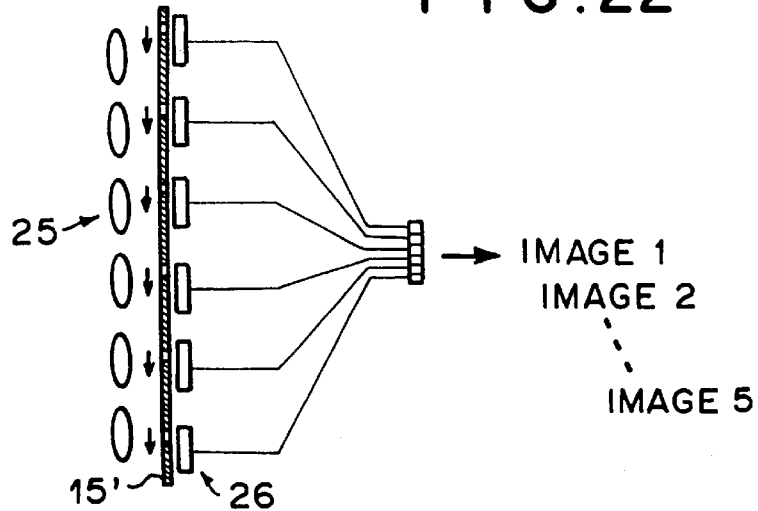
FIG. 22 is an explanatory view showing a further different example of a sampling method, in which a light shutter is utilized, in the second embodiment of the parallax image input apparatus in accordance with the present invention.

With the sampling method of FIG. 20 for each image on the imaging device 26, a plurality of images are acquired simultaneously. Alternatively, sampling of only the components having passed through a certain pupil position may be carried out successively, and parallax images may thereby be obtained successively. In such cases, for example, as illustrated in FIG. 21, light receiving elements 26, 26, . . . maybe moved. As a different example, as illustrated in FIG. 22, a light shutter 15' may be moved.

The microlens array and the pinhole array may be a one-dimensional array or may be a two-dimensional array. In cases where the means for controlling the input position for image information has a one-dimensional array constitution, a lens array having lens power in only a one-dimensional direction, such as a cylindrical lens array, may be employed, or a lens array having lens power in two-dimensional directions, such as a spherical lens array, may be employed.

What is claimed is:

1. A parallax image input apparatus for acquiring a plurality of images of an object seen from different viewpoints, comprising:

i) an image forming means for forming continuous parallax images of the external world, ii) a parallax image pickup means for selectively imaging pieces of image information, which have passed through different positions in said image forming means, and converting said pieces of image information into image signals, and iii) an image recording means for recording said image signals, which have been obtained from said parallax image pickup means;

wherein said parallax image pickup means comprises:

a) an image forming element group, which is composed of a plurality of image forming elements, each of said image forming elements forming an image of one of different portions of an image, which has been formed on a first image plane by said image forming means, on a second image plane, and b) an imaging means, which has a plurality of small regions located on said second image plane so as to correspond to the plurality of said image forming elements, each of said small regions of said imaging means (1) having a plurality of picture element areas, (2) converting the image information, the image of which has been formed, into an image signal, and (3) adapted to simultaneously receive an entire image from the corresponding image forming element;

wherein image formation depends upon a predetermined distance between the object and the image forming element group, and a predetermined distance between the image forming means and the image forming element group.

2. An apparatus as defined in claim 1 wherein said imaging means comprises a plurality of imaging elements, and each of said imaging elements has an imaging plane, which corresponds to one of said small regions.

3. An apparatus as defined in claim 1 wherein said image forming element group is a lens array, which has refracting power in two-dimensional directions.

4. An apparatus as defined in claim 1 wherein said image forming element group is a cylindrical lens array, which has refracting power only in a one-dimensional direction.

5. An apparatus as defined in claim 1 wherein said imaging means simultaneously images a plurality of pieces of image information, which have passed through different positions in said image forming means.

6. An apparatus as defined in claim 1 wherein said imaging means successively images a plurality of pieces of image information, which have passed through different positions in said image forming means.

7. An apparatus as defined in claim 1 wherein said imaging means is a photoelectric conversion imaging means.

8. An apparatus as defined in claim 1 wherein said imaging means is a photochemical reaction imaging means.

* * * * *